United States Patent
Li et al.

(10) Patent No.: US 12,108,410 B2
(45) Date of Patent: Oct. 1, 2024

(54) BANDWIDTH PART SPECIFIC SCHEDULING CONFIGURATION

(71) Applicant: ZTE Corporation, Guangdong (CN)

(72) Inventors: Jian Li, Guangdong (CN); Xingguang Wei, Guangdong (CN); Peng Hao, Guangdong (CN); Yu Ngok Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 530 days.

(21) Appl. No.: 17/489,214

(22) Filed: Sep. 29, 2021

(65) Prior Publication Data

US 2022/0039142 A1 Feb. 3, 2022

Related U.S. Application Data

(63) Continuation of application No. PCT/CN2019/080515, filed on Mar. 29, 2019.

(51) Int. Cl.
*H04W 72/23* (2023.01)
*H04L 5/00* (2006.01)
(52) U.S. Cl.
CPC ........... *H04W 72/23* (2023.01); *H04L 5/0053* (2013.01)
(58) Field of Classification Search
CPC ............................. H04W 72/23; H04L 5/0053
(Continued)

(56) References Cited

U.S. PATENT DOCUMENTS

| 9,485,075 | B2 | 11/2016 | Xiao et al. |
| 11,310,820 | B2 | 4/2022 | Zhu |

(Continued)

FOREIGN PATENT DOCUMENTS

| CN | 101958772 A | 1/2011 |
| CN | 105850207 A | 8/2016 |

(Continued)

OTHER PUBLICATIONS

International Search Report and Written Opinion mailed on Dec. 30, 2019 for International Application No. PCT/CN2019/080515, filed on Mar. 29, 2019 (6 pages).

(Continued)

*Primary Examiner* — Nicholas R Taylor
*Assistant Examiner* — Chong G Kim
(74) *Attorney, Agent, or Firm* — Perkins Coie LLP

(57) ABSTRACT

Methods, apparatus, and systems for reducing signaling overhead in a primary while supporting fast activation of one or more secondary cells are described. In one example aspect, a wireless communication method includes receiving, by a mobile device, a signaling message from a base station for configuring a primary cell and at least one secondary cell. The secondary cell is configured with at least one bandwidth part and the signaling message includes a first information element associated with the bandwidth part. The first information element further includes a second information element for enabling or disabling cross-carrier scheduling for the bandwidth part. The method also includes performing, by the mobile device, blind decoding to obtain scheduling information with respect to the bandwidth part based on whether the cross-carrier scheduling for the bandwidth part is enabled or disabled.

18 Claims, 9 Drawing Sheets receiving, by a mobile device, a signaling message from a base station for configuring a primary cell and at least one secondary cell
402 blind decoding to obtain scheduling information
404

(58) Field of Classification Search
USPC .......................................................... 370/329
See application file for complete search history.

(56) References Cited

U.S. PATENT DOCUMENTS

| | | | |
|---|---|---|---|
| 2012/0307744 | A1 | 12/2012 | Charbit et al. |
| 2019/0357238 | A1* | 11/2019 | Zhou ..................... H04W 72/23 |
| 2020/0229081 | A1* | 7/2020 | Ang ................... H04W 72/0453 |
| 2020/0313833 | A1* | 10/2020 | Yi ........................... H04L 5/001 |
| 2021/0314997 | A1* | 10/2021 | Seo ........................ H04L 5/0094 |
| 2022/0116977 | A1* | 4/2022 | Takahashi .............. H04W 72/23 |

FOREIGN PATENT DOCUMENTS

| | | |
|---|---|---|
| CN | 108234098 A | 6/2018 |
| CN | 108353407 A | 7/2018 |
| CN | 109451854 A | 3/2019 |
| EP | 3716698 A1 | 9/2020 |
| WO | 2015031738 A1 | 3/2015 |
| WO | 2019/050379 A1 | 3/2019 |

OTHER PUBLICATIONS

Nokia et al., "Cell and BWP relation," 3GPP TSG-RAN WG2 #99bis, Prague, Czech Republic, R2-1711065, 5 pages, Oct. 9-13, 2017.

NTT Docomo, Inc., "Draft reply LS on the search space of cross-carrier scheduling," 3GPP TSG RAN WG1 Meeting #95, Spokane, USA, R1-1814311, 2 pages, Nov. 12-16, 2018.

European Search Report for EP Patent Application No. 19923439.4, dated Mar. 17, 2022, 12 pages.

Mediatek Inc., "Efficient SCell Access Switching for NR," 3GPP TSG RAN WG1 Meeting #96, R1-1901807, Athens, Greece, Feb. 25-Mar. 1, 2019, 3 pages.

Qualcomm Incorporated, "Solutions for Fast SCG and SCell Activation," 3GPP TSG-RAN WG1 #96, R1-1903028, Athens, Greece, Feb. 25-Mar. 1, 2019, 6 pages.

European Communication pursuant to Article 94(3) EPC for EP Patent Application No. 19923439.4, dated Mar. 22, 2023, 6 pages.

Chinese office action issued in CN Patent Application No. 201980094834.4, dated Sep. 20, 2023, 18 pages. English translation included.

International Preliminary Report on Patentability issued in International Patent Application No. PCT/CN2019/080515, dated Sep. 28, 2021, 4 pages.

Samsung, "Signaling to support bandwidth part," 3GPP TSG-RAN WG2 NR #99bis Meeting, R2-1711188, Prague, Czech, Oct. 9-13, 2017, 7 pages.

Chinese Notification to Complete Formalities of Registration issued in CN Patent Application No. 201980094834.4, dated Mar. 14, 2024, 4 pages. English translation included.

European Communication under Rule 71(3) EPC issued in EP Patent Application No. 19923439.4, dated May 23, 2024, 46 pages.

Korean office action issued in KR Patent Application No. 10-2021-7034114, dated Jun. 12, 2024, 8 pages. English translation included.

Qualcomm Incorporated, "Potential Techniques for UE Power Saving," 3GPP TSG-RAN WG1 #96, R1-1903016, Athens, Greece, Feb. 25-Mar. 1, 2019, 33 pages.

Qualcomm Incorporated, "Remaining Issues on CA," 3GPP TSG RAN WG1 Meeting #92bis, R1-1804810, Sanya, China, Apr. 16-20, 2018, 11 pages.

* cited by examiner

BANDWIDTH PART SPECIFIC SCHEDULING CONFIGURATION

CROSS-REFERENCE TO RELATED APPLICATIONS

This application is a continuation of International Patent Application No. PCT/CN2019/080515, filed on Mar. 29, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for providing bandwidth part (BWP) specific configurations so that fast activation of one or more secondary cells (SCells) can be performed without impacting signaling overhead of a primary cell (PCell).

In one example aspect, a wireless communication method is disclosed. The method includes receiving, by a mobile device, a signaling message from a base station for configuring a primary cell and at least one secondary cell. The secondary cell is configured with at least one bandwidth part and the signaling message includes a first information element associated with the bandwidth part. The first information element further includes a second information element for enabling or disabling cross-carrier scheduling for the bandwidth part. The method also includes performing, by the mobile device, blind decoding to obtain scheduling information with respect to the bandwidth part based on whether the cross-carrier scheduling for the bandwidth part is enabled or disabled.

In another example aspect, a wireless communication method is disclosed. The method includes transmitting, from a base station to a mobile device, a signaling message for configuring a primary cell and at least one secondary cell. The secondary cell is configured with a bandwidth part and the signaling message includes a first information element associated with the bandwidth part. The first information element further includes a second information element for enabling or disabling cross-carrier scheduling for the bandwidth part to cause the mobile device to perform blind decoding according to whether the cross-carrier scheduling is enabled to disabled.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of 5G wireless protocol. However, applicability of the disclosed techniques is not limited to only 5G wireless systems.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

NR introduced the concept of a carrier bandwidth part (BWP), which is a contiguous subset of the physical resource blocks for a given numerology $\mu$ on a given carrier. The bandwidth part can be used to support several usage scenarios. For example, BWP can support frequency domain multiplexing of different numerologies and enable non-contiguous spectrum. Bandwidth part adaptation can also be used to reduce energy consumption of a user equipment (UE).

Figure 1:
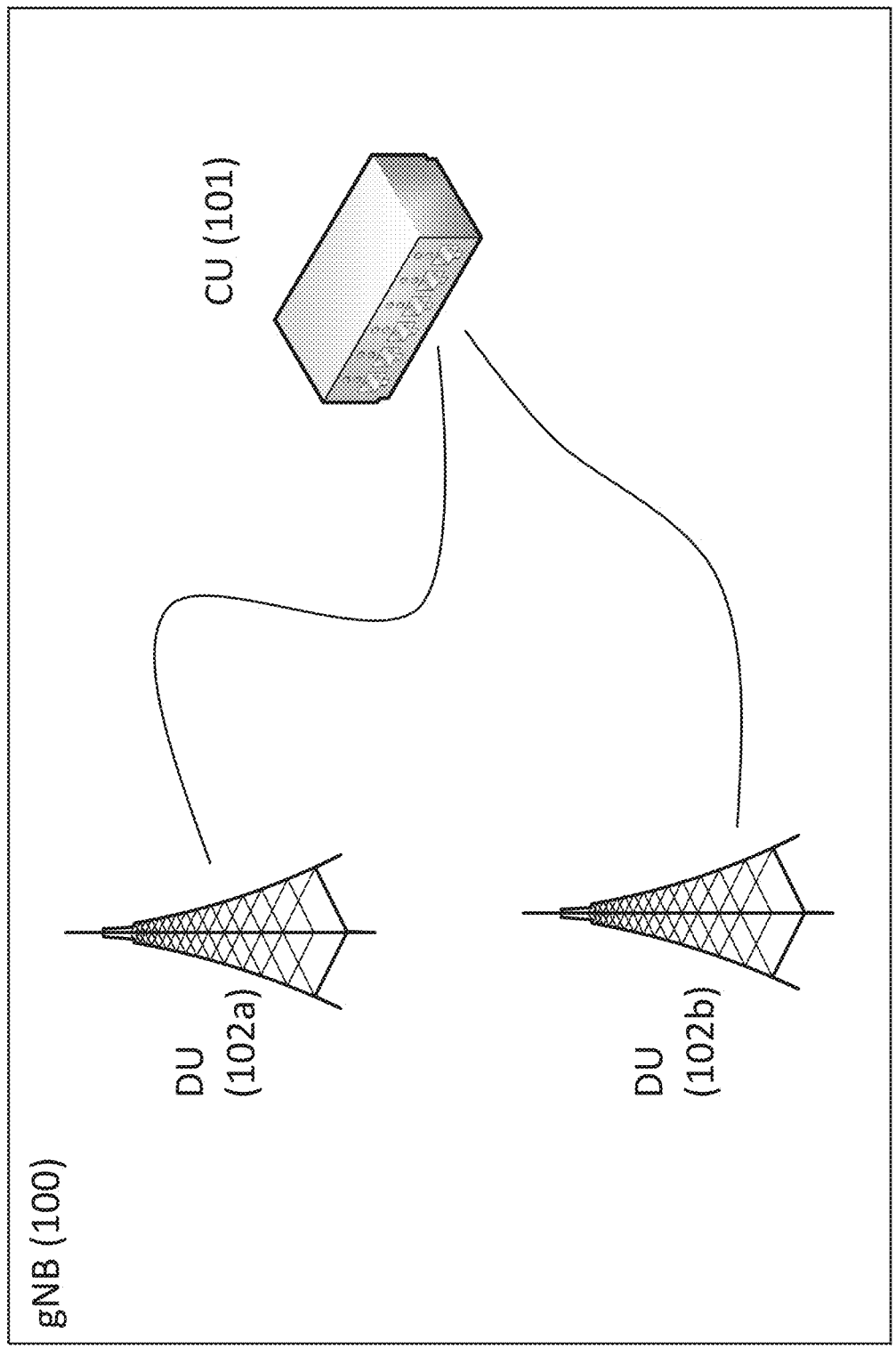
FIG. 1 shows a schematic diagram of a logical structure of a next generation Node B (gNB).

As NR emerges in the wireless domain, the logical structure of a base station has changed. FIG. 1 shows a schematic diagram of a logical structure of a next generation Node B (gNB). The gNB 100 includes a central unit (CU) 101 and one or more distributed units (DUs) 102a, 102b. The CU 101 is a logical node hosting Radio Resource Control (RRC), Service Data Adaptation Protocol (SDAP) and Packet Data Convergence Protocol (PDCP) of the gNB that control the operation of one or more DUs. The DU is a logical node hosting Radio Link Control (RLC), Medium Access Control (MAC) and Physical (PHY) layers of the gNB. One DU can support one or multiple cells, including one primary cell (PCell) and one or more secondary cells (SCells).

Figure 2:
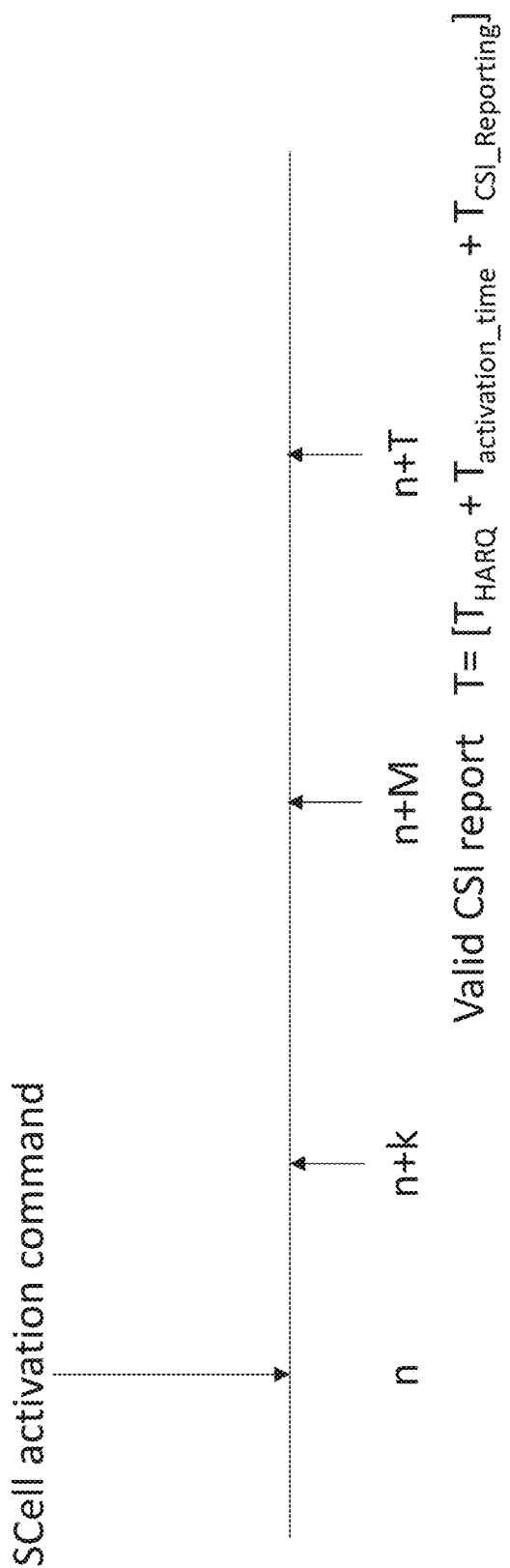
FIG. 2 is an example schematic diagram illustrating the activation delay of a secondary cell.

If the UE is configured with multiple SCells, the base station can activate and deactivate the configured SCells. If the UE receives an SCell activation command at slot n in the time domain, the UE officially starts the SCell activation process at slot n+k and terminates the SCell activation process in the slot when valid Channel State Information (CSI) is reported. FIG. 2 is an example schematic diagram illustrating the activation delay of an SCell. The SCell activation delay mainly includes the following components:

1. Activation start-up delay: from slot n to slot n+k.
2. Activation processing delay: from slot n+k to slot n+M.

Here, k is $k_1 + 3 \cdot N_{slot}^{subframe,\mu} + 1$. $k_1$ is used to indicate the slot in which the Hybrid Automatic Repeat request (HARQ) feedback corresponding to the SCell activation command is located. The calculation of the k value is based on the subcarrier spacing (SCS) of the uplink channel (e.g., the Physical Uplink Control Channel) that carries the HARQ feedback. $k_1$ can correspond to the Layer 1 processing delay and 3 ms can correspond to Layer 2 processing delay and Radio Frequency (RF) warm-up delay.

According to the current 3rd Generation Partnership Project (3GPP) standard TS 38.133, the UE should activate the SCell no later than $n+[T_{HARQ}+T_{activation\_time}+T_{CSI\_Reporting}]$. $T_{HARQ}$ indicates k1. $T_{activation\_time}$ indicates delays such as MAC-CE resolution delay, RF warm up, AGC adjustment, and/or time-frequency offset synchronization. $T_{CSI\_Reporting}$ indicates the delay of the CSI Reference Signal (RS) acquisition by the UE, the CSI-RS processing delay, and/or the uncertainty delay for obtaining the first CSI report resource. Table 1 shows example delay values in existing NR systems.

TABLE 1

Example Delay Values

| Delay | Typical value | Note |
| --- | --- | --- |
| $T_{HARQ}$ | 0.5 ms | Timing between DL data transmission and acknowledgement, i.e., $k_1$ as defined in RAN1. |
| $T_{activation\_time}$ | 10 ms | Delay for time-domain and frequency-domain synchronization, RF warm up and AGC adjustment. 10 ms is the minimum delay for this value. |
| $T_{CSI\_Reporting}$ | 4 ms | Delay for CSI-RS measurement and CSI reporting. Assume that the smallest periodicity of periodic CSI-RS and CSI reporting resource are configured, i.e., 4 ms. The average value is calculated as $T_{CSI\_Reporting} = 0.5*[CSI-RS\ periodicity + CSI\ reporting\ periodicity]$. |

In order to reduce the delays and enable fast activations of SCells, the concept of dormant BWP was proposed. The state of the UE on an SCell in dormant BWP is similar to that of an SCell in deactivated BWP, except for allowing CSI transmissions. The UE does not need to blindly decode the uplink and downlink grants in the dormant BWP. The introduction of the dormant BWP can greatly reduce the activation processing delay to achieve fast activation of the SCells.

However, cross-carrier scheduling is currently defined at the cell level. The Cross-Carrier Scheduling Config Information Element (IE) in Radio Resource Control (RRC) signaling message is used to specify whether cross-carrier scheduling is used in a cell. This means that if there is a dormant BWP on the Scell, which may need cross-carrier scheduling to trigger CSI reporting, then all BWPs in the Scell must have cross-carrier scheduling enabled. The maximum number of SCells supporting cross-carrier scheduling is seven according to the current standard. Scheduling all BWPs in all SCells that support cross-carrier scheduling would impose too much signaling overhead in the PCell. This patent document describes techniques that can be implemented in various embodiment to reduce the signaling overhead in the PCell when one or more SCells is configured with dormant BWP(s). In particular, BWP-specific configurations can be transmitted from the base station to enable cross-carrier scheduling for dormant BWP(s) only so that the SCells can self-schedule transmissions in the non-dormant BWP(s)—the scheduling overhead in the PCell is thus greatly reduced.

Figure 3:
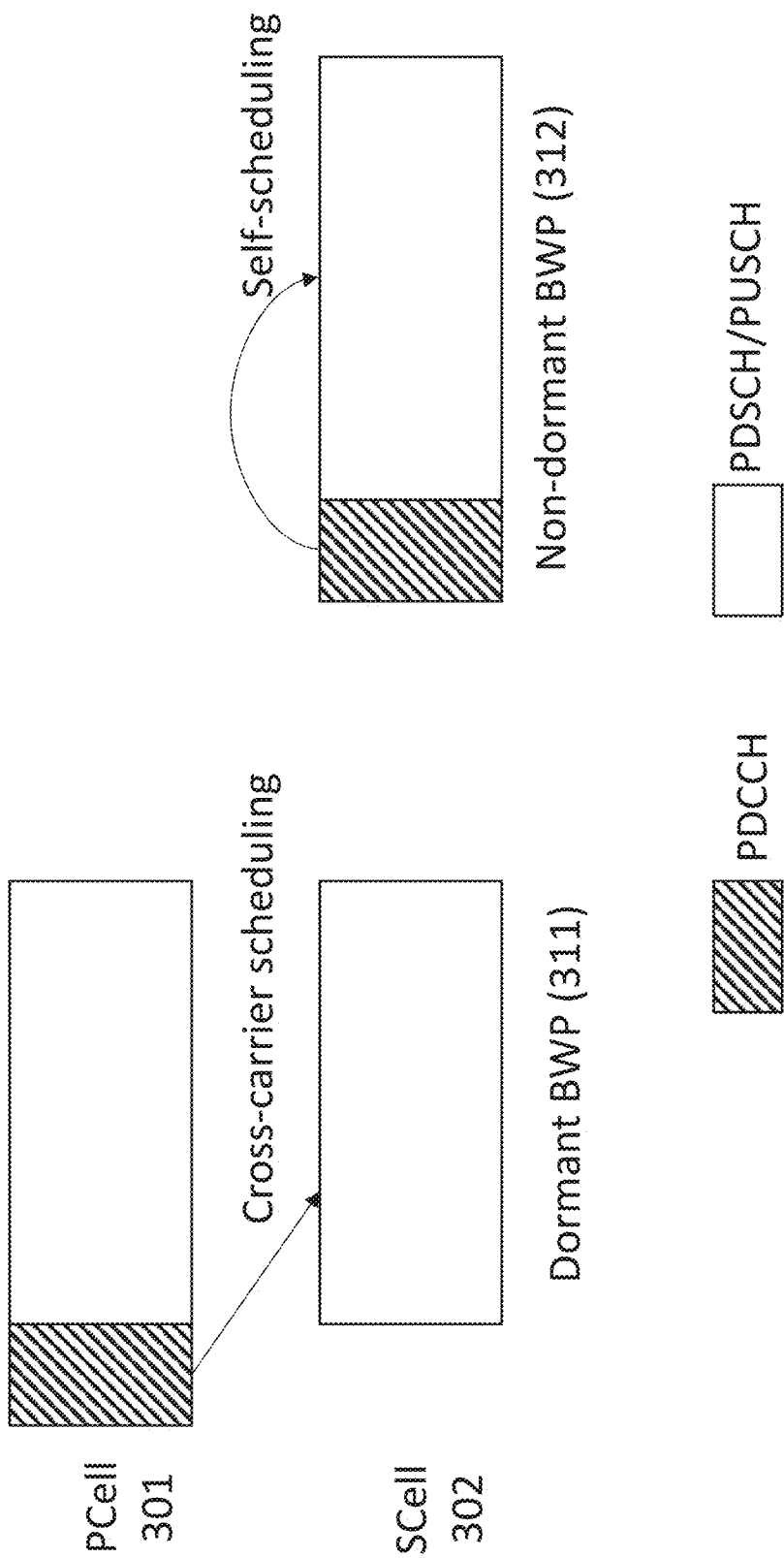
FIG. 3 illustrates a schematic diagram of an example scheduling in accordance with one or more embodiments of the present technology.

FIG. 3 illustrates a schematic diagram of an example scheduling in accordance with one or more embodiments of the present technology. In the SCell 302, the dormant BWP 311 is configured with cross-carrier scheduling enabled such that the PCell 301 can trigger CSI measurement and reporting on the UE. The non-dormant BWP 312 is configured without cross-carrier scheduling to allow the SCell 302 to schedule data traffic by itself.

Figure 4:
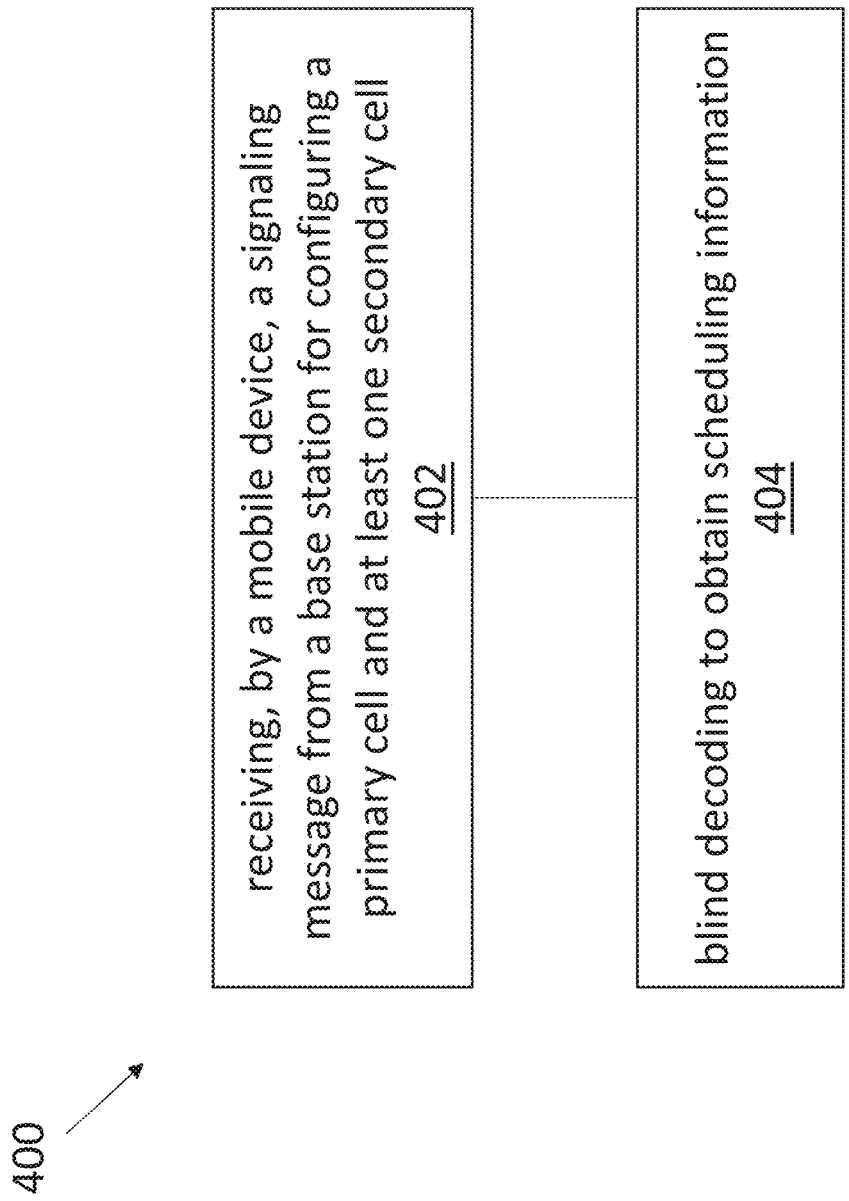
FIG. 4 is a flowchart representation of a method for wireless communication in accordance with one or more embodiments of the present technology.

FIG. 4 is a flowchart representation of a method 400 for wireless communication in accordance with one or more embodiments of the present technology. The method 400 includes, at 402, receiving, by a mobile device, a signaling message from a base station for configuring a primary cell and at least one secondary cell. The secondary cell is configured with at least one bandwidth part and the signaling message includes a first information element associated with the bandwidth part. The first information element further includes a second information element for enabling or disabling cross-carrier scheduling for the bandwidth part. The method 400 also includes, at 404, performing, by the mobile device, blind decoding to obtain scheduling information with respect to the bandwidth part based on whether the cross-carrier scheduling for the bandwidth part is enabled or disabled.

Figure 5:
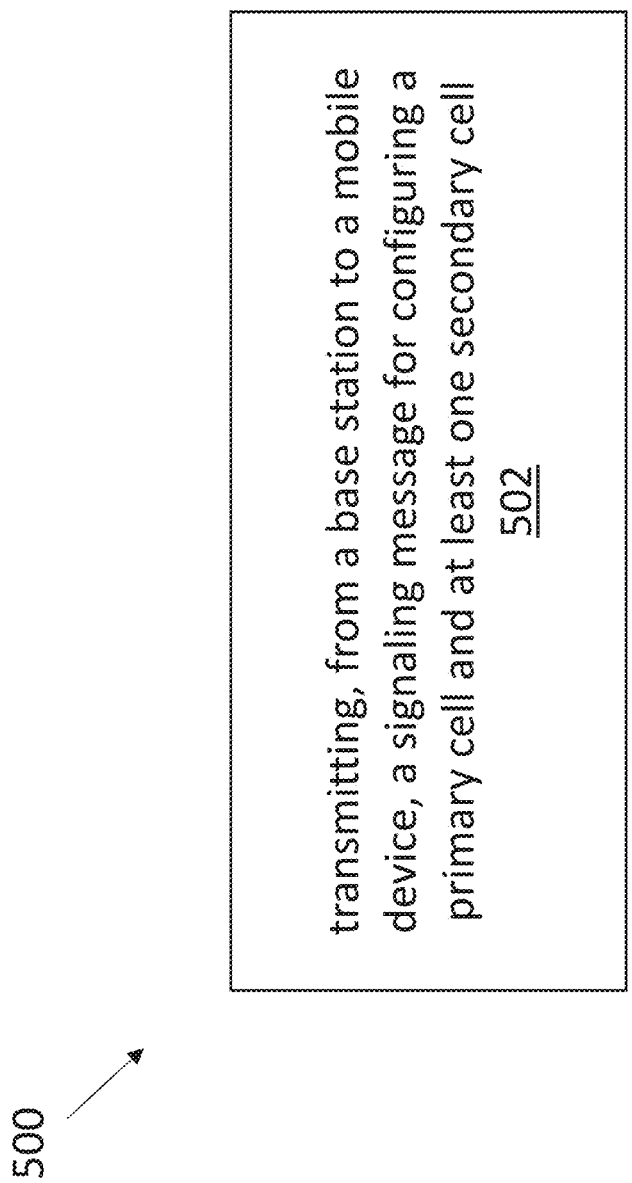
FIG. 5 is a flowchart representation of a method for wireless communication in accordance with one or more embodiments of the present technology.

FIG. 5 is a flowchart representation of a method 600 for wireless communication in accordance with one or more embodiments of the present technology. The method 600 includes, at 502, transmitting, from a base station to a mobile device, a signaling message for configuring a primary cell and at least one secondary cell. The secondary cell is configured with a bandwidth part and the signaling message includes a first information element associated with the bandwidth part. The first information element further includes a second information element for enabling or disabling cross-carrier scheduling for the bandwidth part to cause the mobile device to perform blind decoding according to whether the cross-carrier scheduling is enabled to disabled.

Some examples of the disclosed techniques are described in the following example embodiments.

Embodiment 1

The embodiment describes several possible methods of providing BWP-specific configurations via higher layer signaling (e.g., RRC signaling).

Method 1

A new Information Element (IE)—DormantBWPConfig IE—can be introduced into the RRC signaling message of the NR standard. The DormantBWPConfig IE includes a CrossCarrierSchedulingConfig IE or a sub-IE inside the DormantBWPConfig IE. Table 2 shows an example DormantBWPConfig IE in accordance with one or more embodiments of the present technology.

TABLE 2

Example DormantBWPConfig IE

```
DormantBWPConfig ::=        SEQUENCE {
...
crossCarrierSchedulingConfig    CrossCarrierSchedulingConfig   OPTIONAL,   -- Need M
...
}
```

In some embodiments, the DormantBWPConfig IE includes at least a BWP ID IE, a BWP-DownlinkDedicated IE, and/or a BWP-UplinkDedicated IE. The BWP-DownlinkDedicatedIE can include at least a Physical Downlink Control Channel (PDCCH) Config and/or a Physical Downlink Shared Channel (PDSCH) config IE. The BWP-UplinkDedicated IE can include at least a Physical Uplink Shared Channel (PUSCH) Config IE.

Table 3 shows an example CrossCarrierSchedulingConfig IE in the DormantBWPConfig IE in accordance with one or more embodiments of the present technology.

TABLE 3

Example CrossCarrierSchedulingConfig IE

```
CrossCarrierSchedulingConfig ::=       SEQUENCE {
   schedulingCellInfo           CHOICE {
      own                       SEQUENCE {          -- No cross carrier scheduling
         cif-Presence           BOOLEAN
      },
      other                     SEQUENCE {          -- Cross carrier scheduling
         schedulingCellId           ServCellIndex,
         cif-InSchedulingCell       INTEGER (1..7)
      }
   },
   ...
}
```

Table 4 shows example field descriptions of CrossCarrierSchedulingConfig IE in accordance with one or more embodiments of the present technology.

TABLE 4

Example Field Descriptions of CrossCarrierSchedulingConfig IE

CrossCarrierSchedulingConfig field descriptions cif-Presence

The field is used to indicate whether carrier indicator field is present (value TRUE) or not (value FALSE) in PDCCH DCI formats, see TS 38.213 [13].

cif-InSchedulingCell

The field indicates the CIF value used in the scheduling cell to indicate a grant or assignment applicable for this cell, see TS 38.213 [13]. If cif-Presence is set to true, the CIF value indicating a grant or assignment for this cell is 0.

other

Parameters for cross-carrier scheduling, i.e., a serving cell is scheduled by a PDCCH on another (scheduling) cell. The network configures this field only for SCells.

TABLE 4-continued

Example Field Descriptions of CrossCarrierSchedulingConfig IE

CrossCarrierSchedulingConfig field descriptions own

Parameters for self-scheduling, i.e., a serving cell is scheduled by its own PDCCH.
schedulingCellId Indicates which cell signals the downlink allocations and uplink grants, if applicable, for the concerned SCell. In case the UE is configured with DC, the scheduling cell is part of the same cell group (i.e. MCG or SCG) as the scheduled cell.

If the field "own" is enabled in the CrossCarrierSchedulingConfig IE, the BWP is a self-scheduled BWP. If the field "other" in the CrossCarrierSchedulingConfig IE is enabled, the BWP is a cross-carrier scheduled Dormant BWP, and the scheduling cell is indicated by the schedulingCellId field.

It is noted that the DormantBWPConfig IE can be applied to both uplink and downlink BWP for the SCell. In some embodiments, the UE can indicate, in its capability information, whether the UE supports cell-specific or BWP-specific cross-carrier scheduling (or both). For example, earlier versions of UEs may only support cell-specific cross-carrier scheduling, while newer UEs can support both.

Method 2

A new Information Element (IE)—DormantBWPConfig IE—can be introduced into the RRC signaling message of the NR standard. If the DormantBWPConfig IE is configured for a BWP, then cross-carrier scheduling is enabled for the BWP by default. For example, BWP1 in the SCell is configured as a dormant BWP by the DormantBWPConfig IE. The BWP1 of the Scell uses cross-carrier scheduling by default.

In some embodiments, the DormantBWPConfig IE includes at least a BWP ID IE, a BWP-DownlinkDedicated IE, and/or a BWP-UplinkDedicated IE. The BWP-DownlinkDedicatedIE can include at least a PDCCH-Config and/or a PDSCH-config IE. The BWP-UplinkDedicated IE can include at least a PUSCH-config. IE.

The DormantBWPConfig IE can be applied to both uplink and downlink BWP for the SCell. In some embodiments, the DormantBWPConfig IE can include schedulingCellId field to indicate which cell is the scheduling cell for the cross-carrier scheduling.

In some embodiments, the UE can indicate, in its capability information, whether the UE supports cell-specific or BWP-specific cross-carrier scheduling (or both). For example, earlier versions of UEs may only support cell-specific cross-carrier scheduling, while newer UEs can support both.

Method 3

The CrossCarrierSchedulingConfig IE can be added into existing BWP IEs to accomplish BWP-specific configurations. For example, the CrossCarrierSchedulingConfig IE can be added to BWP-Downlink IE, BWP-Uplink IE, BWP-DownlinkDedicated IE, a BWP-UplinkDedicated IE, BWP-DownlinkCommon IE, BWP-UplinkCommon IE, and/or BWP IE. In some embodiments, the CrossCarrierSchedulingConfig IE can be added to IEs that are associated with BWP configurations, such as PDCCH-Config IE, PDSCH-Config IE, Physical Uplink Control Channel (PUCCH) Config IE, and PUSCH-Config IE.

In some embodiments, the UE can indicate, in its capability information, whether the UE supports cell-specific or BWP-specific cross-carrier scheduling (or both). For example, earlier versions of UEs may only support cell-specific cross-carrier scheduling, while newer UEs can support both.

Table 5 shows an example BWP-Downlink IE that includes the CrossCarrierSchedulingConfig IE in accordance with one or more embodiments of the present technology.

TABLE 5

Example BWP-Downlink IE

```
BWP-Downlink ::=      SEQUENCE {
    bwp-Id            BWP-Id,
    bwp-Common        BWP-DownlinkCommon          OPTIONAL, --
Cond SetupOtherBWP
    bwp-Dedicated     BWP-DownlinkDedicated       OPTIONAL, --
Need M
    crossCarrierSchedulingConfig   CrossCarrierSchedulingConfig
OPTIONAL,  -- Need M
    ...
}
```

Table 6 shows an example BWP-Uplink IE that includes the CrossCarrierSchedulingConfig IE in accordance with one or more embodiments of the present technology.

TABLE 6

Example BWP-Uplink IE

```
BWP-Uplink ::=        SEQUENCE {
  bwp-Id              BWP-Id,
  bwp-Common              BWP-UplinkCommon            OPTIONAL,
-- Cond SetupOtherBWP
  bwp-Dedicated           BWP-UplinkDedicated         OPTIONAL, --
Need M
     crossCarrierSchedulingConfig    CrossCarrierSchedulingConfig
OPTIONAL,  -- Need M
  ...
}
```

Table 7 shows an example BWP-DownlinkDedicated IE that includes the CrossCarrierSchedulingConfig IE in accordance with one or more embodiments of the present technology.

TABLE 7

Example BWP-DownlinkDedicated IE

```
BWP-DownlinkDedicated ::=     SEQUENCE {
  pdcch-Config          SetupRelease { PDCCH-Config }      OPTIONAL,
-- Need M
  pdsch-Config          SetupRelease { PDSCH-Config }      OPTIONAL,
-- Need M
  sps-Config            SetupRelease { SPS-Config }        OPTIONAL, --
Need M
  radioLinkMonitoringConfig     SetupRelease { RadioLinkMonitoringConfig }
OPTIONAL, -- Need M
     crossCarrierSchedulingConfig    CrossCarrierSchedulingConfig
OPTIONAL,  -- Need M
  ...
}
```

Table 8 shows an example BWP-UplinkDedicated IE that includes the CrossCarrierSchedulingConfig IE in accordance with one or more embodiments of the present technology.

TABLE 8

Example BWP-UplinklinkDedicated IE

```
BWP-UplinkDedicated ::=      SEQUENCE {
  pucch-Config          SetupRelease { PUCCH-Config }      OPTIONAL,
-- Need M
  pusch-Config          SetupRelease { PUSCH-Config }      OPTIONAL,
-- Need M
  configuredGrantConfig     SetupRelease { ConfiguredGrantConfig }
OPTIONAL, -- Need M
  srs-Config            SetupRelease { SRS-Config }        OPTIONAL, --
Need M
  beamFailureRecoveryConfig    SetupRelease { BeamFailureRecoveryConfig }
OPTIONAL, -- Cond SpCellOnly
     crossCarrierSchedulingConfig    CrossCarrierSchedulingConfig
OPTIONAL, -- Need M
     . . .
}
```

Table 9 shows an example BWP-DownlinkCommon IE that includes the CrossCarrierSchedulingConfig IE in accordance with one or more embodiments of the present technology.

TABLE 9

Example BWP-DownlinkCommon IE

```
BWP-DownlinkCommon ::=    SEQUENCE {
    genericParameters     BWP,
    pdcch-ConfigCommon           SetupRelease { PDCCH-ConfigCommon }
OPTIONAL, -- Need M
    pdsch-ConfigCommon           SetupRelease { PDSCH-ConfigCommon }
OPTIONAL, -- Need M
        crossCarrierSchedulingConfig    CrossCarrierSchedulingConfig
OPTIONAL, -- Need M
    . . .
}
```

Table 10 shows an example BWP-UplinkCommon IE that includes the CrossCarrierSchedulingConfig IE in accordance with one or more embodiments of the present technology.

TABLE 10

Example BWP-UplinkCommon IE

```
BWP-UplinkCommon ::=    SEQUENCE {
    genericParameters    BWP,
    rach-ConfigCommon           SetupRelease { RACH-ConfigCommon }
```

TABLE 10-continued

Example BWP-UplinkCommon IE

```
OPTIONAL, -- Need M
    pusch-ConfigCommon           SetupRelease { PUSCH-ConfigCommon }
OPTIONAL, -- Need M
    pucch-ConfigCommon           SetupRelease { PUCCH-ConfigCommon }
OPTIONAL, -- Need M
        crossCarrierSchedulingConfig    CrossCarrierSchedulingConfig
OPTIONAL, -- Need M
    . . .
}
```

Table 11 shows an example BWP IE that includes the CrossCarrierSchedulingConfig IE in accordance with one or more embodiments of the present technology.

TABLE 11

Example BWP IE

```
BWP ::=                  SEQUENCE {
    locationAndBandwidth     INTEGER (0 . . . 37949),
    subcarrierSpacing        SubcarrierSpacing,
        cyclicPrefix         ENUMERATED { extended }      OPTIONAL
-- Need R
        crossCarrierSchedulingConfig    CrossCarrierSchedulingConfig
OPTIONAL, -- Need M
}
```

Table 12 shows an example PDCCH-Config IE that includes the CrossCarrierSchedulingConfig IE in accordance with one or more embodiments of the present technology.

TABLE 12

Example PDCCH-Config IE

```
PDCCH-Config ::=         SEQUENCE {
    controlResourceSetToAddModList       SEQUENCE(SIZE (1 . . . 3)) OF ControlResourceSet
OPTIONAL, -- Need N
    controlResourceSetToReleaseList      SEQUENCE(SIZE (1 . . . 3)) OF ControlResourceSetId
OPTIONAL, -- Need N
    searchSpacesToAddModList             SEQUENCE(SIZE (1 . . . 10)) OF SearchSpace
OPTIONAL, -- Need N
    searchSpacesToReleaseList            SEQUENCE(SIZE (1 . . . 10)) OF SearchSpaceId
OPTIONAL, -- Need N
    downlinkPreemption           SetupRelease { DownlinkPreemption }
OPTIONAL, -- Need M
    tpc-PUSCH                    SetupRelease { PUSCH-TPC-CommandConfig }
OPTIONAL, -- Need M
    tpc-PUCCH                    SetupRelease { PUCCH-TPC-CommandConfig }
OPTIONAL, -- Cond PUCCH-CellOnly
    tpc-SRS                      SetupRelease { SRS-TPC-CommandConfig}
OPTIONAL, -- Need M
        crossCarrierSchedulingConfig    CrossCarrierSchedulingConfig
OPTIONAL, -- Need M
    . . .
}
```

Table 13 shows an example PDSCH-Config IE that includes the CrossCarrierSchedulingConfig IE in accordance with one or more embodiments of the present technology.

TABLE 13

Example PDSCH-Config IE

```
PDSCH-Config ::=                    SEQUENCE {
    dataScramblingIdentityPDSCH         INTEGER (0 ... 1023)
OPTIONAL, -- Need S
    dmrs-DownlinkForPDSCH-MappingTypeA          SetupRelease { DMRS-DownlinkConfig }
OPTIONAL, -- Need M
    dmrs-DownlinkForPDSCH-MappingTypeB          SetupRelease { DMRS-DownlinkConfig }
OPTIONAL, -- Need M
    tci-StatesToAddModList          SEQUENCE (SIZE(1 ... maxNrofTCI-States)) OF TCI-State
OPTIONAL, -- Need N
    tci-StatesToReleaseList         SEQUENCE (SIZE(1 ... maxNrofTCI-States)) OF TCI-StateId
OPTIONAL, -- Need N
    vrb-ToPRB-Interleaver           ENUMERATED {n2, n4}
OPTIONAL, -- Need S
    resourceAllocation          ENUMERATED { resourceAllocationType0,
resourceAllocationType1, dynamicSwitch},
    pdsch-TimeDomainAllocationList              SetupRelease { PDSCH-TimeDomainResourceAllocationList
}         OPTIONAL, -- Need M
    pdsch-AggregationFactor         ENUMERATED { n2, n4, n8 }
OPTIONAL, -- Need S
    rateMatchPatternToAddModList            SEQUENCE (SIZE (1 ... maxNrofRateMatchPatterns)) OF
RateMatchPattern       OPTIONAL, -- Need N
    rateMatchPatternToReleaseList           SEQUENCE (SIZE (1 ... maxNrofRateMatchPatterns)) OF
RateMatchPatternId      OPTIONAL, -- Need N
    rateMatchPatternGroup1          RateMatchPatternGroup
OPTIONAL, -- Need R
    rateMatchPatternGroup2          RateMatchPatternGroup
OPTIONAL, -- Need R
    rbg-Size                ENUMERATED {config1, config2},
    mcs-Table               ENUMERATED {qam256, qam64LowSE}
OPTIONAL, -- Need S
    maxNrofCodeWordsScheduledByDCI              ENUMERATED {n1, n2}
OPTIONAL, -- Need R
    prb-BundlingType                CHOICE {
      staticBundling                SEQUENCE {
        bundleSize                  ENUMERATED { n4, wideband }
OPTIONAL -- Need S
      },
      dynamicBundling               SEQUENCE {
        bundleSizeSet1              ENUMERATED { n4, wideband, n2-wideband, n4-wideband }
OPTIONAL, -- Need S
        bundleSizeSet2              ENUMERATED { n4, wideband }
OPTIONAL -- Need S
      }
    },
    zp-CSI-RS-ResourceToAddModList              SEQUENCE (SIZE (1 ... maxNrofZP-CSI-RS-
Resources)) OF ZP-CSI-RS-Resource
                                                    OPTIONAL, -- Need N
    zp-CSI-RS-ResourceToReleaseList             SEQUENCE (SIZE (1 ... maxNrofZP-CSI-RS-Resources))
OF ZP-CSI-RS-ResourceId
                                                    OPTIONAL, -- Need N
    aperiodic-ZP-CSI-RS-ResourceSetsToAddModList            SEQUENCE (SIZE (1 ... maxNrofZP-CSI-RS-
ResourceSets)) OF ZP-CSI-RS-ResourceSet
                                                    OPTIONAL, -- Need N
    aperiodic-ZP-CSI-RS-ResourceSetsToReleaseList SEQUENCE (SIZE (1 ... maxNrofZP-CSI-RS-
ResourceSets)) OF ZP-CSI-RS-ResourceSetId
                                                    OPTIONAL, -- Need N
    sp-ZP-CSI-RS-ResourceSetsToAddModList   SEQUENCE (SIZE (1 ... maxNrofZP-CSI-RS-
ResourceSets)) OF ZP-CSI-RS-ResourceSet
                                                    OPTIONAL, -- Need N
    sp-ZP-CSI-RS-ResourceSetsToReleaseList   SEQUENCE (SIZE (1 ... maxNrofZP-CSI-RS-
ResourceSets)) OF ZP-CSI-RS-ResourceSetId
                                                    OPTIONAL, -- Need N
    p-ZP-CSI-RS-ResourceSet             SetupRelease { ZP-CSI-RS-ResourceSet }
                                                    OPTIONAL, -- Need M
      crossCarrierSchedulingConfig          CrossCarrierSchedulingConfig
OPTIONAL, -- Need M
   ...
}
```

TABLE 13-continued

Example PDSCH-Config IE

```
RateMatchPatternGroup ::=              SEQUENCE (SIZE (1 . . . maxNrofRateMatchPatternsPerGroup)) OF
CHOICE {
    cellLevel                          RateMatchPatternId,
    bwpLevel                           RateMatchPatternId
}
```

Table 14 shows an example PUCCH-Config IE that includes the CrossCarrierSchedulingConfig IE in accordance with one or more embodiments of the present technology.

TABLE 14

Example PUCCH-Config IE

```
PUCCH-Config ::=                       SEQUENCE {
    resourceSetToAddModList                SEQUENCE (SIZE (1 . . . maxNrofPUCCH-ResourceSets)) OF
PUCCH-Resource Set                 OPTIONAL, -- Need N
    resourceSetToReleaseList               SEQUENCE (SIZE (1 . . . maxNrofPUCCH-ResourceSets)) OF
PUCCH-ResourceSetId                OPTIONAL, -- Need N
    resourceToAddModList                   SEQUENCE (SIZE (1 . . . maxNrofPUCCH-Resources)) OF
PUCCH-Resource                     OPTIONAL, -- Need N
    resourceToReleaseList                  SEQUENCE (SIZE (1 . . . maxNrofPUCCH-Resources)) OF PUCCH-
ResourceId                OPTIONAL, -- Need N
    format1                        SetupRelease { PUCCH-FormatConfig }
OPTIONAL, -- Need M
    format2                        SetupRelease { PUCCH-FormatConfig }
OPTIONAL, -- Need M
    format3                        SetupRelease { PUCCH-FormatConfig }
OPTIONAL, -- Need M
    format4                        SetupRelease { PUCCH-FormatConfig }
OPTIONAL, -- Need M
    schedulingRequestResourceToAddModList   SEQUENCE (SIZE (1 . . . maxNrofSR-Resources)) OF
SchedulingRequestResourceConfig   OPTIONAL, -- Need N
    schedulingRequestResourceToReleaseList    SEQUENCE (SIZE (1 . . . maxNrofSR-Resources)) OF
SchedulingRequestResourceId       OPTIONAL, -- Need N
    multi-CSI-PUCCH-ResourceList          SEQUENCE (SIZE (1 . . . 2)) OF PUCCH-ResourceId
OPTIONAL, -- Need M
    dl-DataToUL-ACK                SEQUENCE (SIZE (1 . . . 8)) OF INTEGER (0 . . . 15)
OPTIONAL, -- Need M
    spatialRelationInfoToAddModList        SEQUENCE (SIZE (1 . . . maxNrofSpatialRelationInfos)) OF
PUCCH-SpatialRelationInfo OPTIONAL, -- Need N
    spatialRelationInfoToReleaseList      SEQUENCE (SIZE (1 . . . maxNrofSpatialRelationInfos)) OF
PUCCH-SpatialRelationInfoId
                                                                         OPTIONAL, -- Need N
    pucch-PowerControl             PUCCH-PowerControl
OPTIONAL, -- Need M
    crossCarrierSchedulingConfig   CrossCarrierSchedulingConfig
        OPTIONAL, -- Need M
    . . .
}
```

Table 15 shows an example PUSCH-Config IE that includes the CrossCarrierSchedulingConfig IE in accordance with one or more embodiments of the present technology.

TABLE 15

Example PUSCH-Config IE

```
PUSCH-Config ::=                       SEQUENCE {
    dataScramblingIdentityPUSCH            INTEGER (0 . . . 1023)
OPTIONAL, -- Need S
    txConfig                   ENUMERATED {codebook, nonCodebook}
OPTIONAL, -- Need S
    dmrs-UplinkForPUSCH-MappingTypeA        SetupRelease { DMRS-UplinkConfig }
OPTIONAL, -- Need M
    dmrs-UplinkForPUSCH-MappingTypeB        SetupRelease { DMRS-UplinkConfig }
OPTIONAL, -- Need M
    pusch-PowerControl             PUSCH-PowerControl
```

TABLE 15-continued

Example PUSCH-Config IE

```
OPTIONAL, -- Need M
    frequencyHopping           ENUMERATED {intraSlot, interSlot}
OPTIONAL, -- Need S
    frequencyHoppingOffsetLists         SEQUENCE (SIZE (1 . . . 4)) OF INTEGER (1 . . .
maxNrofPhysicalResourceBlocks-1)        OPTIONAL, --Need M
    resourceAllocation         ENUMERATED { resourceAllocationType0,
resourceAllocationType1, dynamic Switch},
    pusch-TimeDomainAllocationList          SetupRelease { PUSCH-TimeDomainResourceAllocationList
}           OPTIONAL, -- Need M
    pusch-AggregationFactor    ENUMERATED { n2, n4, n8 }
OPTIONAL, -- Need S
    mcs-Table                  ENUMERATED {qam256, qam64LowSE}
OPTIONAL, -- Need S
    mcs-TableTransformPrecoder         ENUMERATED {qam256, qam64LowSE}
OPTIONAL, -- Need S
    transformPrecoder          ENUMERATED {enabled, disabled}
OPTIONAL, -- Need S
    codebookSubset             ENUMERATED {fullyAndPartialAndNonCoherent,
partialAndNonCoherent,
                               nonCoherent}                                OPTIONAL, -- Cond
codebookBased
    maxRank                    INTEGER (1 . . . 4)                         OPTIONAL, -- Cond
codebookBased
    rbg-Size                   ENUMERATED { config2}                       OPTIONAL, --
Need S
    uci-OnPUSCH                SetupRelease { UCI-OnPUSCH}
OPTIONAL, -- Need M
    tp-pi2BPSK                 ENUMERATED {enabled}                        OPTIONAL,
-- Need S
       crossCarrierSchedulingConfig         CrossCarrierSchedulingConfig
OPTIONAL, -- Need M
    . . .
}
UCI-OnPUSCH ::=                SEQUENCE {
    betaOffsets                CHOICE {
        dynamic                SEQUENCE (SIZE (4)) OF BetaOffsets,
        semiStatic             BetaOffsets
    }                                                                      OPTIONAL, -- Need M
scaling                        ENUMERATED { f0p5, f0p65, f0p8, f1 }
}
```

Table 16 shows an example PDCCH-ConfigCommon IE that includes the CrossCarrierSchedulingConfig IE in accordance with one or more embodiments of the present technology.

TABLE 16

Example PDCCH-ConfigCommon IE

```
PDCCH-ConfigCommon ::=         SEQUENCE {
    controlResourceSetZero     ControlResourceSetZero                      OPTIONAL, --
Cond InitialBWP-Only
    commonControlResourceSet           ControlResourceSet                  OPTIONAL, --
Need R
    searchSpaceZero            SearchSpaceZero                             OPTIONAL, -- Cond
InitialBWP-Only
    commonSearchSpaceList              SEQUENCE (SIZE(1 . . . 4)) OF SearchSpace
OPTIONAL, -- Need R
    searchSpaceSIB1            SearchSpaceId                               OPTIONAL, -- Need S
    searchSpaceOtherSystemInformation          SearchSpaceId               OPTIONAL, --
Need S
    pagingSearchSpace          SearchSpaceId                               OPTIONAL, -- Need S
    ra-SearchSpace             SearchSpaceId                               OPTIONAL, -- Need S
       crossCarrierSchedulingConfig         CrossCarrierSchedulingConfig
OPTIONAL, -- Need M
. . . ,
    [[
    firstPDCCH-MonitoringOccasionOfPO          CHOICE {
        sCS15KHZoneT                                                       SEQUENCE (SIZE (1 . . . maxPO-perPF)) OF
INTEGER (0 . . . 139),
        sCS30KHZoneT-SCS15KHZhalfT                                         SEQUENCE (SIZE (1 . . . maxPO-
perPF)) OF INTEGER (0 . . . 279),
        sCS60KHZoneT-SCS30KHZhalfT-SCS15KHZquarterT                        SEQUENCE (SIZE
(1 . . . maxPO-perPF)) OF INTEGER (0 . . . 559),
```

TABLE 16-continued

Example PDCCH-ConfigCommon IE

```
    sCS120KHZoneT-SCS60KHZhalfT-SCS30KHZquarterT-SCS15KHZoneEighthT
SEQUENCE (SIZE (1 . . . maxPO-perPF)) OF INTEGER (0 . . . 1119),
    sCS120KHZhalfT-SCS60KHZquarterT-SCS30KHZoneEighthT-SCS15KHZoneSixteenthT
SEQUENCE (SIZE (1 . . . maxPO-perPF)) OF INTEGER (0 . . . 2239),
    sCS120KHZquarterT-SCS60KHZoneEighthT-SCS30KHZoneSixteenthT         SEQUENCE
(SIZE (1 . . . maxPO-perPF)) OF INTEGER (0 . . . 4479),
    sCS120KHZoneEighthT-SCS60KHZoneSixteenthT                    SEQUENCE (SIZE
(1 . . . maxPO-perPF)) OF INTEGER (0 . . . 8959),
    sCS120KHZoneSixteenthT                SEQUENCE (SIZE (1 . . . maxPO-perPF))
OF INTEGER (0 . . . 17919)
    }                                              OPTIONAL       -- Cond OtherBWP
    ]]
}
```

Table 17 shows an example PDSCH-ConfigCommon IE that includes the CrossCarrierSchedulingConfig IE in accordance with one or more embodiments of the present technology.

TABLE 17

Example PDSCH-ConfigCommon IE

```
PDSCH-ConfigCommon ::=      SEQUENCE {
    pdsch-TimeDomainAllocationList          PDSCH-TimeDomainResourceAllocationList
OPTIONAL, -- Need R
    crossCarrierSchedulingConfig     CrossCarrierSchedulingConfig
OPTIONAL, -- Need M
    . . .
}
```

Table 18 shows an example PUSCH-ConfigCommon IE that includes the CrossCarrierSchedulingConfig IE in accordance with one or more embodiments of the present technology.

TABLE 18

Example PUSCH-ConfigCommon IE

```
PUSCH-ConfigCommon ::=      SEQUENCE {
    groupHoppingEnabledTransformPrecoding      ENUMERATED {enabled}
OPTIONAL, -- Need R
    pusch-TimeDomainAllocationList          PUSCH-TimeDomainResourceAllocationList
OPTIONAL, -- Need R
    msg3-DeltaPreamble         INTEGER (-1 . . . 6)                  OPTIONAL,
-- Need R
    p0-NominalWithGrant        INTEGER (-202 . . . 24)
OPTIONAL, -- Need R
    crossCarrierSchedulingConfig     CrossCarrierSchedulingConfig
OPTIONAL, -- Need M
    . . .
}
```

Table 19 shows an example PUCCH-ConfigCommon IE that includes the CrossCarrierSchedulingConfig IE in accordance with one or more embodiments of the present technology.

TABLE 19

Example PUCCH-ConfigCommon IE

```
PUCCH-ConfigCommon ::=      SEQUENCE {
    pucch-ResourceCommon       INTEGER (0 . . . 15)         OPTIONAL, -- Cond
InitialBWP-Only
    pucch-GroupHopping      ENUMERATED { neither, enable, disable },
    hoppingId         INTEGER (0 . . . 1023)            OPTIONAL, -- Need R
    p0-nominal        INTEGER (-202 . . . 24)           OPTIONAL, -- Need R
    crossCarrierSchedulingConfig        CrossCarrierSchedulingConfig
```

TABLE 19-continued

Example PUCCH-ConfigCommon IE

OPTIONAL, -- Need M
 . . .
}

Table 20 shows an example Semi-Persistent Scheduling (SPS) Config IE that includes the CrossCarrierScheduling-Config IE in accordance with one or more embodiments of the present technology.

TABLE 20

Example SPS-Config IE

```
SPS-Config ::=          SEQUENCE {
    periodicity         ENUMERATED {ms10, ms20, ms32, ms40, ms64, ms80, ms128, ms160,
ms320, ms640,
                        spare6, spare5, spare4, spare3, spare2, spare1},
    nrofHARQ-Processes      INTEGER (1 . . . 8),
    n1PUCCH-AN          PUCCH-ResourceId                                  OPTIONAL,
-- Need M
    mcs-Table           ENUMERATED {qam64LowSE}
OPTIONAL, -- Need S
    crossCarrierSchedulingConfig    CrossCarrierSchedulingConfig
OPTIONAL, -- Need M
    . . .
}
```

Table 21 shows an example RadioLinkMonitoringConfig IE that includes the CrossCarrierSchedulingConfig IE in accordance with one or more embodiments of the present technology.

TABLE 21

Example RadioLinkMonitoringConfig IE

```
RadioLinkMonitoringConfig ::=       SEQUENCE {
    failureDetectionResourcesToAddModList       SEQUENCE
(SIZE(1 . . maxNrofFailureDetectionResources))          OF RadioLinkMonitoringRS OPTIONAL, --Need N
    failureDetectionResourcesToReleaseList      SEQUENCE (SIZE(1 . . maxNrofFailureDetectionResources))
OF RadioLinkMonitoringRS-Id
                                                                        OPTIONAL, -- Need N
    beamFailureInstanceMaxCount         ENUMERATED {n1, n2, n3, n4, n5, n6, n8, n10}
OPTIONAL, -- Need R
    beamFailureDetectionTimer           ENUMERATED {pbfd1, pbfd2, pbfd3, pbfd4, pbfd5, pbfd6,
pbfd8, pbfd10}          OPTIONAL, -- Need R
    crossCarrierSchedulingConfig        CrossCarrierSchedulingConfig
OPTIONAL, -- Need M
    . . .
}
RadioLinkMonitoringRS ::=       SEQUENCE {
    radioLinkMonitoringRS-Id        RadioLinkMonitoringRS-Id,
    purpose             ENUMERATED {beamFailure, rlf, both},
    detectionResource       CHOICE {
      ssb-Index         SSB-Index,
      csi-RS-Index      NZP-CSI-RS-ResourceId
    },
    . . .
}
```

Table 22 shows an example ConfiguredGrantConfig IE that includes the CrossCarrierSchedulingConfig IE in accordance with one or more embodiments of the present technology.

TABLE 22

Example ConfiguredGrantConfig IE

```
ConfiguredGrantConfig ::=       SEQUENCE {
    frequencyHopping                ENUMERATED {intraSlot, interSlot}
OPTIONAL, -- Need S,
    cg-DMRS-Configuration           DMRS-UplinkConfig,
    mcs-Table                   ENUMERATED {qam256, qam64LowSE}
OPTIONAL, -- Need S
    mcs-TableTransformPrecoder          ENUMERATED {qam256, qam64LowSE}
OPTIONAL, -- Need S
    uci-OnPUSCH                 SetupRelease { CG-UCI-OnPUSCH }
OPTIONAL, -- Need M
    resourceAllocation          ENUMERATED { resourceAllocationType0, resourceAllocationType1,
dynamicSwitch },
    rbg-Size                ENUMERATED {config2}                     OPTIONAL, --
Need S
    powerControlLoopToUse           ENUMERATED {n0, n1},
    p0-PUSCH-Alpha              P0-PUSCH-AlphaSetId,
    transformPrecoder           ENUMERATED {enabled, disabled}
OPTIONAL, -- Need S
    nrofHARQ-Processes              INTEGER(1 . . . 16),
    repK                    ENUMERATED {n1, n2, n4, n8},
    repK-RV                 ENUMERATED {s1-0231, s2-0303, s3-0000}
OPTIONAL, -- Need R
    periodicity             ENUMERATED {
                    sym2, sym7, sym1×14, sym2×14, sym4×14, sym5×14, sym8×14,
sym10×14, sym16×14, sym20×14,
                    sym32×14, sym40×14, sym64×14, sym80×14, sym128×14, sym160×14,
sym256×14, sym320×14, sym512×14,
                    sym640×14, sym1024×14, sym1280×14, sym2560×14, sym5120×14,
                    sym6, sym1×12, sym2x12, sym4×12, sym5×12, sym8×12, sym10×12,
sym16×12, sym20×12, sym32×12,
                    sym40×12, sym64×12, sym80×12, sym128×12, sym160×12, sym256×12,
sym320×12, sym512×12, sym640×12,
                    sym1280×12, sym2560×12
    },
    configuredGrantTimer        INTEGER (1 . . . 64)                 OPTIONAL, --
Need R
    rrc-ConfiguredUplinkGrant       SEQUENCE {
        timeDomainOffset            INTEGER (0 . . . 5119),
        timeDomainAllocation            INTEGER (0 . . . 15),
        frequencyDomainAllocation       BIT STRING (SIZE(18)),
        antennaPort             INTEGER (0 . . . 31),
        dmrs-SeqInitialization          INTEGER (0 . . . 1)              OPTIONAL, --
Need R
        precodingAndNumberOfLayers          INTEGER (0 . . . 63),
        srs-ResourceIndicator           INTEGER (0 . . . 15)                 OPTIONAL, --
Need R
        mcsAndTBS               INTEGER (0 . . . 31),
        frequencyHoppingOffset          INTEGER (1 . . . maxNrofPhysicalResourceBlocks-1)
OPTIONAL, -- Need R
        pathlossReferenceIndex          INTEGER (0 . . . maxNrofPUSCH-PathlossReferenceRSs-1),
            crossCarrierSchedulingConfig        CrossCarrierSchedulingConfig
OPTIONAL, -- Need M
    . . .
    }                                   OPTIONAL, -- Need R
    . . .
}
CG-UCI-OnPUSCH ::=CHOICE {
    dynamic         SEQUENCE (SIZE (1 . . . 4)) OF BetaOffsets,
    semiStatic          BetaOffsets
}
```

Embodiment 2

This embodiment describes an example scenario for configuring BWPs of the SCell. The base station (e.g., gNB) sends a signaling message (e.g., RRC signaling message) to a UE to configure the PCell and one or more SCells.

Figure 8:
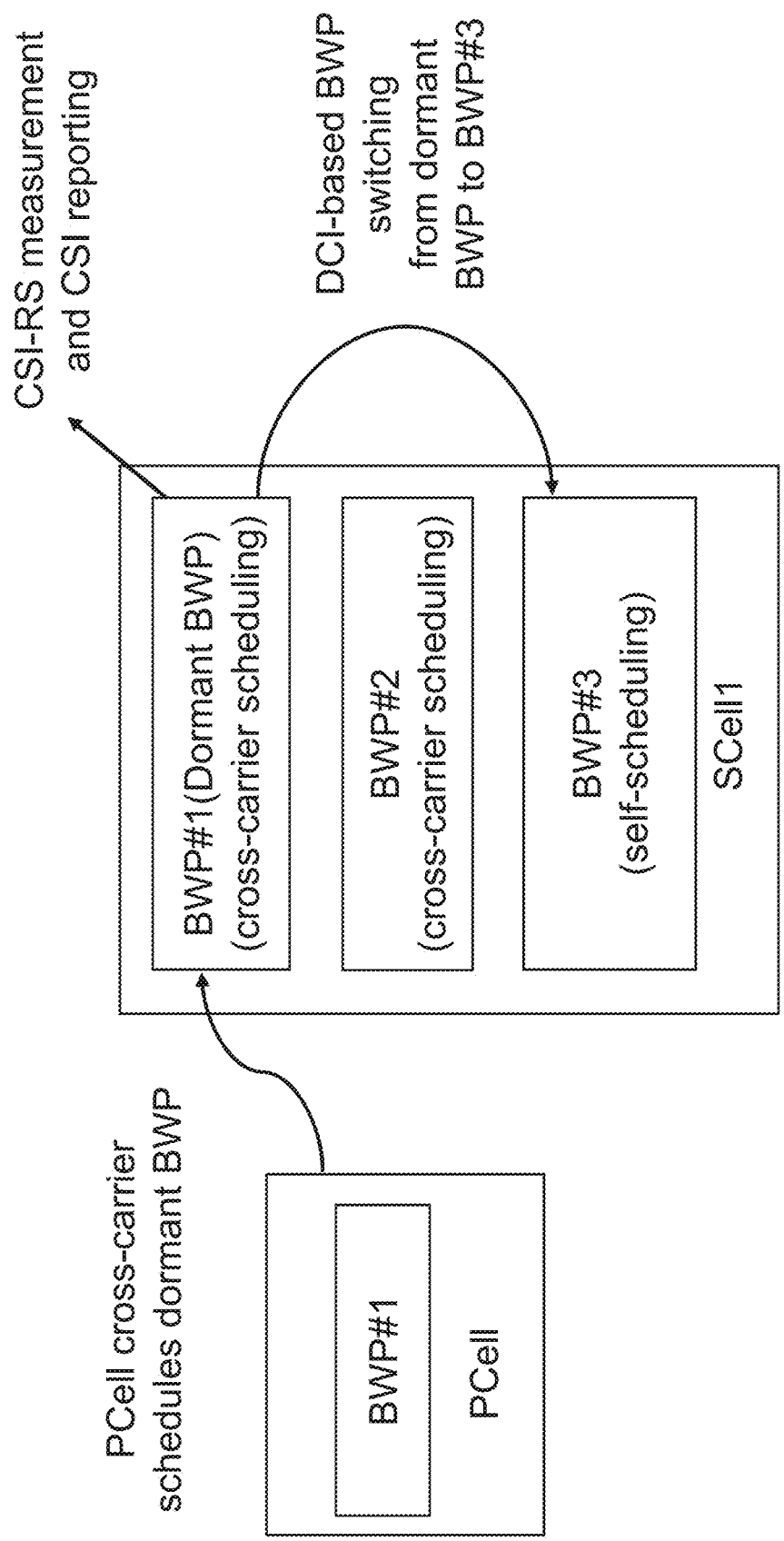
FIG. 8 shows a schematic diagram of an example configuration of a primary cell and a secondary cell in accordance with one or more embodiments of the present technology.

FIG. 8 shows a schematic diagram of an example configuration of a primary cell and a secondary cell in accordance with one or more embodiments of the present technology. As shown in FIG. 8, SCell 1 is configured multiple BWPs: BWP #1, BWP #2, and BWP #3. The gNB can enable cross-carrier scheduling for BWP #1 so that it can act as a dormant BWP. The BWP #1 can also be configured with increased CSI measurement periods to help the UE conserve power. Furthermore, in some embodiments, BWP #1 can be configured as a BWP with small bandwidth for energy saving purposes. The BWP #3 can be configured to disable cross-carrier scheduling to act as a non-dormant BWP. The bandwidth of BWP #3 can be larger.

In some embodiments, the gNB can include resource configuration for the CSI reference signal (RS) in the RRC message. The RRC message can further include configurations for CSI calculation as well as channel resource configuration for CSI reporting. The CSI-RS can be periodic, semi-persistent, or aperiodic. The CSI reporting can also be periodic, semi-persistent, or aperiodic. In some embodiments, periodic and semi-persistent CSI reporting is performed on the PUCCH. In some embodiments, aperiodic and semi-persistent CSI reporting is performed on PUSCH.

Periodic CSI reporting and periodic CSI-RS can be configured and activated by higher layer signaling, such as RRC signaling messages. Semi-persistent CSI reporting on PUCCH and semi-persistent CSI-RS can be activated by the MAC Control Element (CE). Aperiodic CSI-RS, aperiodic CSI reporting, and semi-persistent CSI reporting on PUSCH can be triggered or activated by DCI messages.

Figure 9:
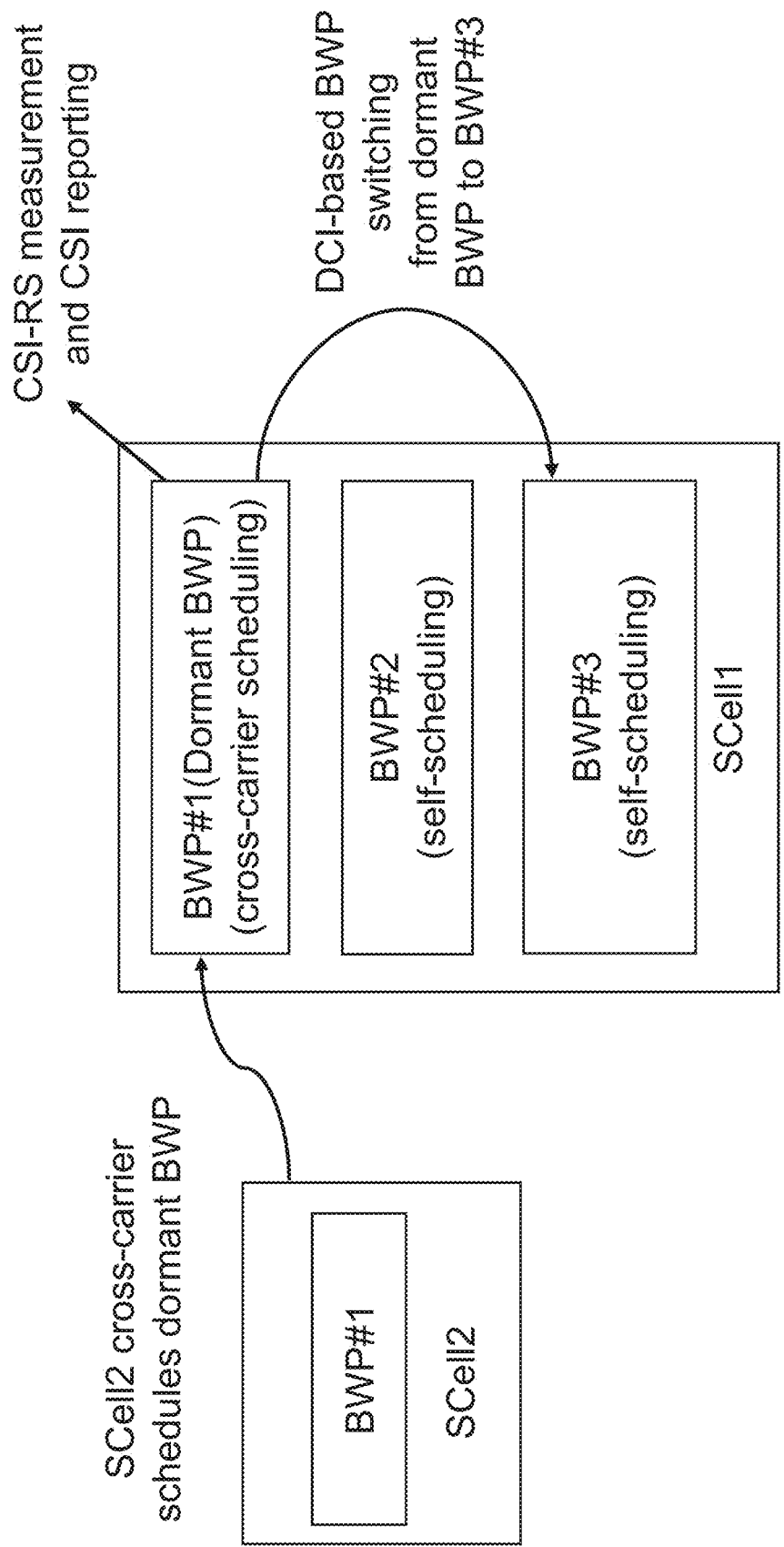
FIG. 9 shows a schematic diagram of an example configuration of secondary cells in accordance with one or more embodiments of the present technology.

In some embodiments, the gNB sends a Downlink Control Information (DCI) message to the UE to indicate uplink grant(s) and/or downlink allocations. In some cases, when BWP #1 is the activated BWP, the gNB sends the scheduling information via a scheduling cell. In FIG. 8, the scheduling cell is PCell. FIG. 9 shows a schematic diagram of an example configuration of secondary cells in accordance with one or more embodiments of the present technology. The scheduling cell in FIG. 9 is SCell2. When BWP #3 is the activated BWP, the gNB can send the scheduling information directly via SCell. For example, the UE can determine, based on the Carrier Indicator Field (CIF) in the DCI message, whether a downlink (DL) grant is for the SCell. If so, and the BWP #1 is currently activated, then semi-persistent CSI measurement and reporting can be activated by the MAC CE. As another example, the UE can determine, based on the CIF in the DCI message, whether an uplink (UL) grant is for the SCell. If so, and the BWP #1 is currently activated, then aperiodic CSI reporting can be triggered by the CSI request field.

In some embodiments, at least one search space is configured for the dormant BWP of the SCell by the gNB. In some embodiments, the search space may not be configured for the dormant BWP of the SCell by the gNB.

In some embodiments, when data traffic suddenly increases, the gNB can send a DCI message to the UE to switch BWP. For example, SCell is configured with multiple BWPs and BWP #1 is currently activated. The DCI message can include 2 bits indicating a switch operation to BWP #3. After BWP switching is completed, the UE performs blind decoding of control information in BWP #3 of the SCell because cross-carrier scheduling is disabled for BWP #3.

When data traffic suddenly reduces, the gNB can send another DCI message to the UE to switch BWP again. The currently activated BWP #3 is switched back to BWP #1. Because BWP #1 is configured with cross-carrier scheduling enabled, the UE performs blind decoding of control information in the activated BWP of a scheduling cell (e.g., the PCell in FIG. 8 or SCell2 in FIG. 9) after the switch.

Figure 6:
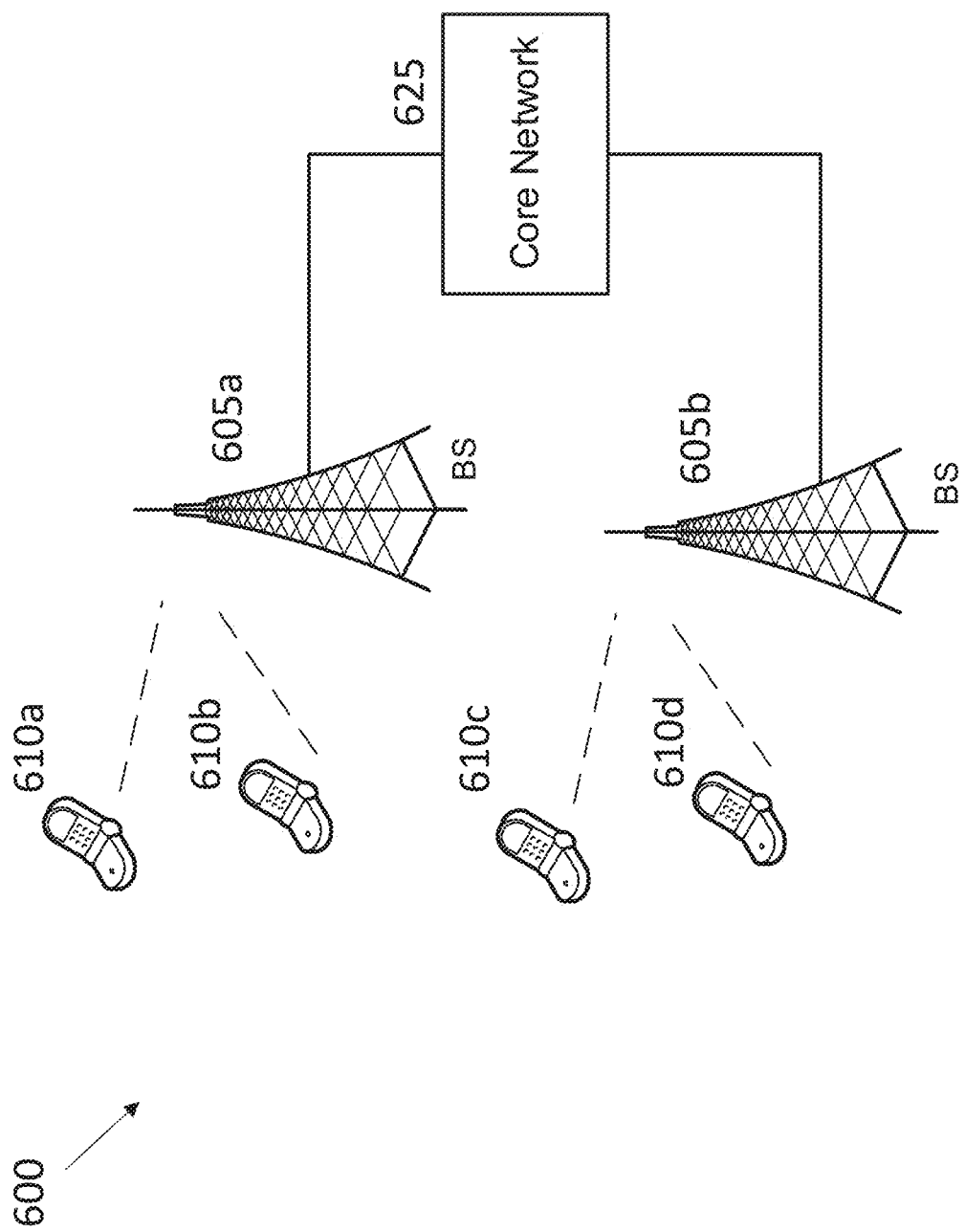
FIG. 6 shows an example of a wireless communication system where techniques in accordance with one or more embodiments of the present technology can be applied.

FIG. 6 shows an example of a wireless communication system 600 where techniques in accordance with one or more embodiments of the present technology can be applied. A wireless communication system 600 can include one or more base stations (BSs) 605a, 605b, one or more wireless devices 610a, 610b, 610c, 610d, and a core network 625. A base station 605a, 605b can provide wireless service to wireless devices 610a, 610b, 610c and 610d in one or more wireless sectors. In some implementations, a base station 605a, 605b includes directional antennas to produce two or more directional beams to provide wireless coverage in different sectors.

The core network 625 can communicate with one or more base stations 605a, 605b. The core network 625 provides connectivity with other wireless communication systems and wired communication systems. The core network may include one or more service subscription databases to store information related to the subscribed wireless devices 610a, 610b, 610c, and 610d. A first base station 605a can provide wireless service based on a first radio access technology, whereas a second base station 605b can provide wireless service based on a second radio access technology. The base stations 605a and 605b may be co-located or may be separately installed in the field according to the deployment scenario. The wireless devices 610a, 610b, 610c, and 610d can support multiple different radio access technologies.

Figure 7:
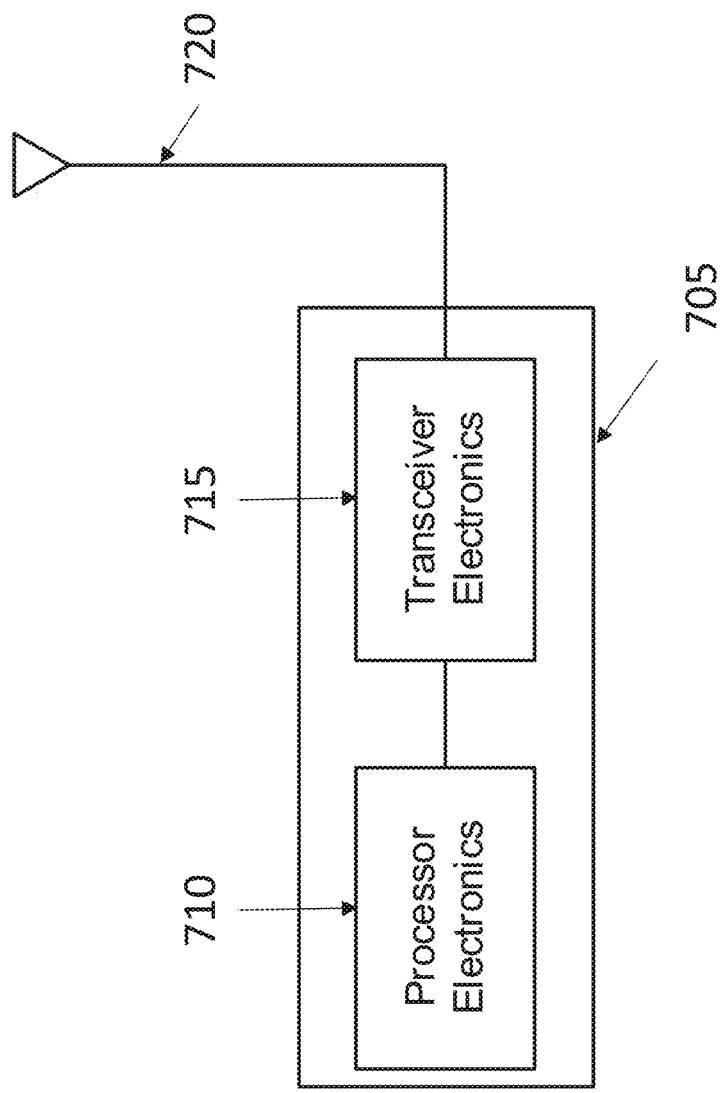
FIG. 7 is a block diagram representation of a portion of a radio station in accordance with one or more embodiments of the present technology can be applied.

FIG. 7 is a block diagram representation of a portion of a radio station. A radio station 705 such as a base station or a wireless device (or UE) can include processor electronics 710 such as a microprocessor that implements one or more of the wireless techniques presented in this document. The radio station 705 can include transceiver electronics 715 to send and/or receive wireless signals over one or more communication interfaces such as antenna 720. The radio station 705 can include other communication interfaces for transmitting and receiving data. Radio station 705 can include one or more memories (not explicitly shown) configured to store information such as data and/or instructions. In some implementations, the processor electronics 710 can include at least a portion of the transceiver electronics 715. In some embodiments, at least some of the disclosed techniques, modules or functions are implemented using the radio station 705.

It will be appreciated that the present document discloses techniques that can be embodied into wireless communication systems to provide bandwidth part specific configurations in order to reduce signaling overhead in a primary cell while supporting fast activation of the secondary cell(s).

In one example aspect, a wireless communication method includes receiving, by a mobile device, a signaling message from a base station for configuring a primary cell and at least one secondary cell. The secondary cell is configured with at least one bandwidth part and the signaling message includes a first information element associated with the bandwidth part. The first information element further includes a second information element for enabling or disabling cross-carrier scheduling for the bandwidth part. The method also includes performing, by the mobile device, blind decoding to obtain scheduling information with respect to the bandwidth part based on whether the cross-carrier scheduling for the bandwidth part is enabled or disabled.

In some embodiments, the method includes receiving, by the mobile device, a Downlink Control Information (DCI) message from the base station triggering an aperiodic Channel State Information measurement and reporting and performing, by the mobile device, the aperiodic Channel State Information measuring and reporting for the bandwidth part.

In some embodiments, the method includes receiving, by the mobile device, a second message from the base station triggering a semi-persistent Channel State Information measurement and reporting and performing, by the mobile device, the semi-persist Channel State Information measuring and reporting for the bandwidth part. The second message is a Medium Access Control (MAC) message or a Downlink Control Information (DCI) message;

In some embodiments, the performing comprises performing, by the mobile device, blind decoding in a scheduling cell to obtain scheduling information with respect to the bandwidth part upon determining that the cross-carrier scheduling for the bandwidth part is enabled. In some embodiments, the performing comprises performing, by the mobile device, blind decoding in the secondary cell to obtain scheduling information with respect to the bandwidth part upon determining that the cross-carrier scheduling for the bandwidth part is disabled.

In some embodiments, the signaling message includes a third information element for enabling or disabling cross-carrier scheduling for the secondary cell. In some embodiments, the first information element associated with the bandwidth part is a dormant bandwidth part information element. In some embodiments, the first information element associated with the bandwidth part includes a bandwidth part downlink information element or a bandwidth part uplink information element. In some embodiments, the first information element associated with the bandwidth part includes a bandwidth part downlink dedicated information element or a bandwidth part uplink dedicated information element. In some embodiments, the first information element associated with the bandwidth part includes a Physical Downlink Control Channel config information element. In some embodiments, the first information element associated with the bandwidth part includes a Physical Downlink Shared Channel config information element or a Physical Uplink Shared Channel config information element.

In some embodiments, the cross-carrier scheduling is enabled by default for the bandwidth part. In some embodiments, the first information element indicates a scheduling cell that is configured to signal scheduling information with respect to the bandwidth part to the mobile station. In some embodiments, the scheduling cell includes the primary cell, the secondary cell, or a different secondary cell.

In another example aspect, a wireless communication method includes transmitting, from a base station to a mobile device, a signaling message for configuring a primary cell and at least one secondary cell. The secondary cell is configured with a bandwidth part and the signaling message includes a first information element associated with the bandwidth part. The first information element further includes a second information element for enabling or disabling cross-carrier scheduling for the bandwidth part to cause the mobile device to perform blind decoding according to whether the cross-carrier scheduling is enabled to disabled.

In some embodiments, the method includes transmitting, by the base station, a Downlink Control Information (DCI) message to the mobile device triggering an aperiodic Channel State Information measurement and reporting. In some embodiments, the method includes transmitting, by the base station, a second message to the mobile device triggering a semi-persistent Channel State Information measurement and reporting. The second message is a Medium Access Control (MAC) message or a Downlink Control Information (DCI) message.

In some embodiments, the signaling message includes a third information element for enabling or disabling cross-carrier scheduling for the secondary cell. In some embodiments, the first information element associated with the bandwidth part is a dormant bandwidth part information element. In some embodiments, the first information element associated with the bandwidth part includes a bandwidth part downlink information element or a bandwidth part uplink information element. In some embodiments, the first information element associated with the bandwidth part includes a bandwidth part downlink dedicated information element or a bandwidth part uplink dedicated information element. In some embodiments, the first information element associated with the bandwidth part includes a Physical Downlink Control Channel config information element. In some embodiments, the first information element associated with the bandwidth part includes a Physical Downlink Shared Channel config information element or a Physical Uplink Shared Channel config information element.

In some embodiments, the cross-carrier scheduling is enabled by default for the bandwidth part. In some embodiments, the first information element indicates a scheduling cell that is configured to signal scheduling information with respect to the bandwidth part to the mobile station. In some embodiments, the scheduling cell includes the primary cell, the secondary cell, or a different secondary cell.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A wireless communication method, comprising:
receiving, by a mobile device, a signaling message from a base station for configuring a primary cell and a secondary cell, wherein the secondary cell is configured with a bandwidth part and the signaling message includes a first information element including an identifier for the bandwidth part, the first information element further including a second information element for enabling or disabling cross-carrier scheduling for the bandwidth part causing the bandwidth part of the secondary cell to be scheduled by a scheduling cell or the secondary cell; and
performing, by the mobile device, blind decoding in the scheduling cell or the secondary cell to obtain scheduling information with respect to the bandwidth part from the scheduling cell in case that the cross-carrier scheduling is enabled and to obtain the scheduling information from the secondary cell in case that the cross-carrier scheduling is disabled.

2. The method of claim 1, further comprising:
receiving, by the mobile device, a Downlink Control Information (DCI) message from the base station triggering an aperiodic Channel State Information measurement and reporting; and
performing, by the mobile device, the aperiodic Channel State Information measuring and reporting for the bandwidth part.

3. The method of claim 1, further comprising:
receiving, by the mobile device, a second message from the base station triggering a semi-persistent Channel State Information measurement and reporting, wherein the second message is a Medium Access Control (MAC) message or a Downlink Control Information (DCI) message; and
performing, by the mobile device, the semi-persist Channel State Information measuring and reporting for the bandwidth part.

4. The method of claim 1, wherein the signaling message includes a third information element for enabling or disabling cross-carrier scheduling for the secondary cell.

5. The method of claim 1, wherein the first information element associated with the bandwidth part includes at least one of 1) a dormant bandwidth part information element, 2) a bandwidth part downlink information element, 3) a bandwidth part uplink information element, 4) a bandwidth part downlink dedicated information element, 5) a bandwidth part uplink dedicated information element, 6) a Physical Downlink Control Channel config information element, 7) a Physical Downlink Shared Channel config information element, or 8) a Physical Uplink Shared Channel config information element.

6. The method of claim 1, wherein the cross-carrier scheduling is enabled by default for the bandwidth part.

7. The method of claim 1, wherein the first information element indicates a scheduling cell that is configured to signal scheduling information with respect to the bandwidth part to the mobile station.

8. A wireless communication method, comprising:
transmitting, from a base station to a mobile device, a signaling message for configuring a primary cell and a secondary cell, wherein the secondary cell is configured with a bandwidth part and the signaling message includes a first information element including an identifier for the bandwidth part, the first information element further including a second information element for enabling or disabling cross-carrier scheduling for the bandwidth part causing the mobile device to perform blind decoding in a scheduling cell or the secondary cell such that scheduling information with respect to the bandwidth part is obtained from the scheduling cell in case that the cross-carrier scheduling is enabled and obtained from the secondary cell in case that the cross-carrier scheduling is disabled.

9. The method of claim 8, further comprising:
transmitting, by the base station, a Downlink Control Information (DCI) message to the mobile device triggering an aperiodic Channel State Information measurement and reporting, or transmitting, by the base station, a second message to the mobile device triggering a semi-persistent Channel State Information measurement and reporting, wherein the second message is a Medium Access Control (MAC) message or a Downlink Control Information (DCI) message.

10. The method of claim 8, wherein the signaling message includes a third information element for enabling or disabling cross-carrier scheduling for the secondary cell.

11. The method of claim 8, wherein the first information element associated with the bandwidth part includes 1) a dormant bandwidth part information element, 2) a bandwidth part downlink information element, 3) a bandwidth part uplink information element, 4) a bandwidth part downlink dedicated information element, 5) a bandwidth part uplink dedicated information element, 6) a Physical Downlink Control Channel config information element, 7) a Physical Downlink Shared Channel config information element, or 8) a Physical Uplink Shared Channel config information element.

12. The method of claim 8, wherein the cross-carrier scheduling is enabled by default for the bandwidth part.

13. The method of claim 8, wherein the first information element indicates a scheduling cell that is configured to signal scheduling information with respect to the bandwidth part to the mobile device.

14. The method of claim 13, wherein the scheduling cell includes the primary cell, the secondary cell, or a different secondary cell.

15. A communication device comprising a processor and a memory, wherein the processor is configured to:
receive a signaling message from a base station for configuring a primary cell and a secondary cell, wherein the secondary cell is configured with a bandwidth part and the signaling message includes a first information element including an identifier for the bandwidth part, the first information element further including a second information element for enabling or disabling cross-carrier scheduling for the bandwidth part causing the bandwidth part of the secondary cell to be scheduled by a scheduling cell or the secondary cell; and
perform blind decoding in the scheduling cell or the secondary cell to obtain scheduling information with respect to the bandwidth part from the scheduling cell in case that the cross-carrier scheduling is enabled and to obtain the scheduling information from the secondary cell in case that the cross-carrier scheduling is disabled.

16. The communication device of claim 15, wherein the processor is further configured to:
receive a Downlink Control Information (DCI) message from the base station triggering an aperiodic Channel State Information measurement and reporting; and
perform the aperiodic Channel State Information measuring and reporting for the bandwidth part.

17. The communication device of claim 15, wherein the processor is further configured to:
receive a second message from the base station triggering a semi-persistent Channel State Information measurement and reporting, wherein the second message is a Medium Access Control (MAC) message or a Downlink Control Information (DCI) message; and
perform the semi-persist Channel State Information measuring and reporting for the bandwidth part.

18. The communication device of claim 15, wherein the first information element associated with the bandwidth part includes at least one of 1) a dormant bandwidth part information element, 2) a bandwidth part downlink information element, 3) a bandwidth part uplink information element, 4) a bandwidth part downlink dedicated information element, 5) a bandwidth part uplink dedicated information element, 6) a Physical Downlink Control Channel config information element, 7) a Physical Downlink Shared Channel config information element, or 8) a Physical Uplink Shared Channel config information element.

* * * * *